United States Patent
Long et al.

(10) Patent No.: US 9,489,248 B2
(45) Date of Patent: Nov. 8, 2016

(54) METHOD, APPARATUS AND SYSTEM FOR ACQUIRING INPUT EVENTS

(71) Applicant: TENCENT TECHNOLOGY (SHENZHEN) COMPANY LIMITED, Shenzhen, Guangdong (CN)

(72) Inventors: Xingping Long, Shenzhen (CN); Xuecheng Luo, Shenzhen (CN); Ruiqing Ou, Shenzhen (CN); Maowu Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/871,726

(22) Filed: Sep. 30, 2015

(65) Prior Publication Data
US 2016/0026511 A1    Jan. 28, 2016

Related U.S. Application Data

(63) Continuation of application No. PCT/CN2014/072523, filed on Feb. 25, 2014.

(30) Foreign Application Priority Data

May 28, 2013    (CN) .......................... 2013 1 0204030

(51) Int. Cl.
*G06F 3/00*    (2006.01)
*G06F 9/44*    (2006.01)
*G06F 9/46*    (2006.01)
*G06F 13/00*   (2006.01)
*G06F 9/54*    (2006.01)

(52) U.S. Cl.
CPC ......... *G06F 9/542* (2013.01); *G06F 2209/543* (2013.01)

(58) Field of Classification Search
CPC ...................................... G06F 9/542
USPC ........................................ 719/318
See application file for complete search history.

(56) References Cited

U.S. PATENT DOCUMENTS 5,872,995 A * 2/1999 Chaiken ............... G06F 13/24
710/5
6,782,350 B1 * 8/2004 Burnley ............. G06F 11/3419
702/177

* cited by examiner

*Primary Examiner* — Timothy A Murdrick
(74) *Attorney, Agent, or Firm* — Anova Law Group, PLLC

(57) ABSTRACT

A method, apparatus and system for acquiring an input event in a computer system comprising different priorities for processes are provided, the method comprising: executing a servant process and a master process, wherein the servant process comprises a higher priority than the master process and an input event list; and upon the servant process acquiring an input event and determining that the input event is in the input event list, the servant process transmitting the input event to the master process. A servant process with a high priority is used to acquire input events, which facilitates the operation of other processes and enhances process execution efficiency.

19 Claims, 6 Drawing Sheets

METHOD, APPARATUS AND SYSTEM FOR ACQUIRING INPUT EVENTS

CROSS-REFERENCE TO RELATED APPLICATIONS

This application is a continuation of International Patent Application No. PCT/CN2014/072523, entitled "Method, Apparatus and System for Acquiring Input Events," filed on Feb. 25, 2014. This application claims the benefit and priority of Chinese Patent Application No. 201310204030.X, entitled "Method, Apparatus and System for Acquiring Input Events," filed on May 28, 2013. The entire disclosures of each of the above applications are incorporated herein by reference.

TECHNICAL FIELD

The present invention relates to computer technologies, and more particularly to a method, apparatus and system for acquiring input events.

BACKGROUND

Operating system is the collection of system software that manages the computer's hardware resources, controls the execution of application programs, and provides an interactive user interface. Operating system is a critical component of a computer system, and is responsible for the management and configuration of system memory, determining the priorities of system resources, controlling input and output devices, network operation and management, file systems, and other basic tasks. The operating system aims to maximize the utilization of resources of the computer system, provide a variety of user interfaces, and offer support for the development of other software applications.

A process is an instance of a computer program being executed. A process can request and control system resources, and is dynamic. A process is not limited to program code, but also includes the execution of the program code, including the values in the program counter and system registers. The rights of a process are typically being controlled. For security reasons, a user typically cannot terminate the processes initiated by other users, or access data in other processes.

A conventional process running under normal priority cannot access the input events (such as key events or mouse button events) acquired by the processes having a higher priority, which might prevent the process with normal priority from operating normally, thereby resulting in execution inefficiency.

SUMMARY OF THE INVENTION

In accordance with embodiments of the present invention, a method, apparatus and system for acquiring input events are provided to enhance process execution efficiency.

In accordance with embodiments of the present invention, a method for acquiring an input event in a computer system comprising different priorities for processes is provided, the method comprising: executing a servant process and a master process, wherein the servant process comprises a higher priority than the master process and an input event list; and upon the servant process acquiring an input event and determining that the input event is in the input event list, the servant process transmitting the input event to the master process.

In accordance with embodiments of the present invention, an apparatus for acquiring an input event in a computer system comprising different priorities for processes is provided, comprising: a process execution unit for executing a servant process and a master process; a setup unit for setting the servant process with a higher priority than the master process, and for setting up an input event list in the servant process; and an event transmission unit for, upon the servant process acquiring an input event and determining that the input event is in the input event list, transmitting the input event to the master process.

In accordance with embodiments of the present invention, a system for acquiring an input event in a computer system comprising different priorities for processes is provided, comprising: a current running process execution unit for executing the current running process; a master process execution unit for executing the master process and a servant process executing unit for executing the servant process; wherein the servant process comprises an input event list, a priority of the servant process is higher than a priority of the master process, and higher than or equal to a priority of the current running process; and the servant process execution process is configured for acquiring an input event; upon determining that the input event is in the input event list, transmitting the input event to the master process; and upon determining that the input event is not in the input event list, transmitting the input event to the current running process.

In accordance with embodiments of the present invention, a servant process and a master process are executed, wherein the servant process comprises a higher priority than the master process and an input event list; and upon the servant process acquiring an input event and determining that the input event is in the input event list, the input event is being transmitted to the master process. Thus, the embodiments of the present invention provide a technical solution for acquiring input events using a servant process having a high priority, which facilitates the operation of other processes, enhances process execution efficiency, and does not interfere with processing of input events by other processes.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

A conventional process running under normal priority cannot access the input events (such as key events or mouse button events) acquired by the processes having a higher priority, which might prevent the process with normal priority from operating normally, thereby resulting in execution inefficiency.

For example, in gaming software, it is often desired to conduct interactive conversations among multiple users using audio communication software. The gaming process typically runs with a high priority, while the audio communication process runs with a low priority. In operating system without strict access control, the users can initiate audio communication by holding a particular key; upon acquiring that key event, the audio process transmits the audio to other users.

However, in operating systems with strict access control, such as Windows 7, processes with normal priority typically cannot acquire the input events in processes with high priority. Thus, when the gaming program is running, the audio communication software cannot acquire the relevant key events to transmit the audio to other users. In operating systems with strict access control, such as Windows 7, the priority of every user operation is checked before execution, and only user operations with the proper priority are allowed to execute.

If the above issue is addressed using a system hook or "hot key" API to intercept key events, it may interfere with the processing of key events by other processes, and slow down the system.

The embodiments of the present invention provide a technical solution for acquiring input events using a servant process having a high priority, which facilitates the operation of other processes, enhances execution efficiency, and does not interfere with processing of input events by other processes.

Figure 1:
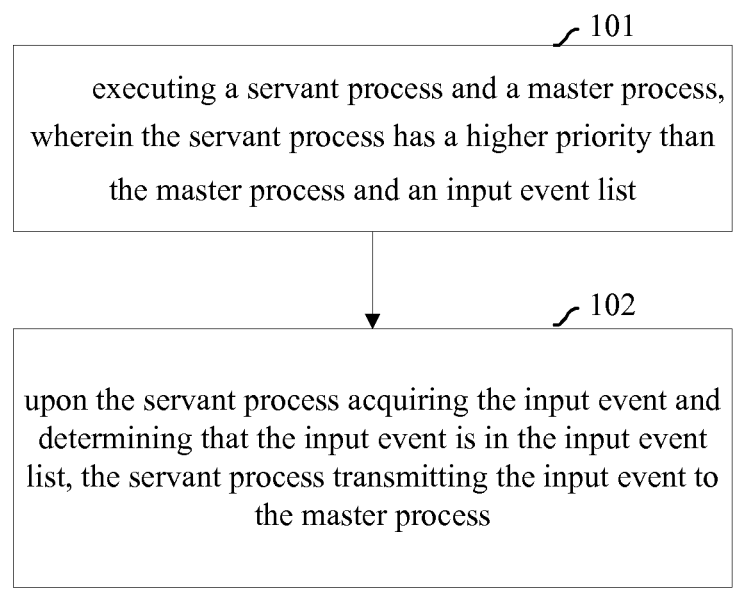
FIG. 1 is an exemplary flowchart for a method for acquiring input events in accordance with an embodiment of the present invention.

FIG. 1 is an exemplary flowchart for a method for acquiring input events in accordance with an embodiment of the present invention. As shown in FIG. 1, the method includes the following steps.

Step 101: executing a servant process and a master process, wherein the servant process has a higher priority than the master process and an input event list.

Here, the servant process can be installed through an installation program. In operating systems such as the Windows, the priority of the installation program may be set based on requirement, and the user can set the priority of the installation program in a prompt window. A high priority can first be set for the installation program, and the installation program can subsequently set the priority for the servant process to be higher than the priority of the master process.

The servant process has the rights to acquire the input events, such as key events or mouse button events, in processes having the same or lower priority as the servant process, and transmit the acquired events to other processes in need of acquiring such events through inter-process communication mechanisms.

In addition, the servant process has an input event list. The input event list contains the input events to be reported to the master process. The input events can include key events or mouse button events.

For example, the input event list may contain certain special keys, or the combination of certain keys. The key values of the special keys or key combinations are transmitted to the master process only when these special keys or key combinations are pressed to avoid unnecessary transmission of input events.

Step 102: upon the servant process acquiring the input event and determining that the input event is in the input event list, the servant process transmitting the input event to the master process.

Here, after the master process receives the input event, it processes the input event accordingly.

In practice, the servant process can create a servant sub-process that has the same priority and functions as the servant process, and the servant sub-process can be used to acquire the input events. When the servant sub-process determines that the input event is contained in the input event list, it transmits the input event to the master process.

In this embodiment, when there are a number of master processes, the servant process can include a number of servant sub-processes, each corresponding to a master processes. Each servant sub-process can be used to acquire the input events, and transmit the input events to the corresponding master process.

In another embodiment, the method further include: setting the priority of the servant process higher than or equal to a priority of a current running process; and transmitting the input event to the current running process.

In another embodiment, the input event can be a key event or a mouse button event, and the step of the servant process acquiring the input event includes the servant process calling an API command GetAsyncKeyState( ) to acquire a key event or a mouse button event.

In this embodiment, by way of example, the API command GetAsyncKeyState( ) is used for acquiring a key event or a mouse button event. Those skilled in the art would understand that the present invention is not limited to the API command GetAsyncKeyState( ) and that other API commands can be used to acquire the input events.

Also this embodiment is also described, by way of example, in connection with the Windows 7 operating system. Those skilled in the art would understand that the present invention is not limited to the Windows 7 operating system, and is applicable to any operating system that controls access to system resources.

In another embodiment, the input event list includes a plurality of key values that the master process is configured to process. The step of the servant process acquiring the input event and determining that the input event is in the input event list includes: servant process acquiring a key value, determining whether the master process is configured to process the key value, and if so, transmitting the key value to the master process.

In another embodiment, the input event list includes a plurality of mouse button values that the master process is configured to process. The step of the servant process acquiring the input event and determining that the input event is in the input event list comprising: servant process acquiring a mouse button value, determining whether the master process is configured to process the mouse button value, and if so, transmitting the mouse button value to the master process.

Figure 2:
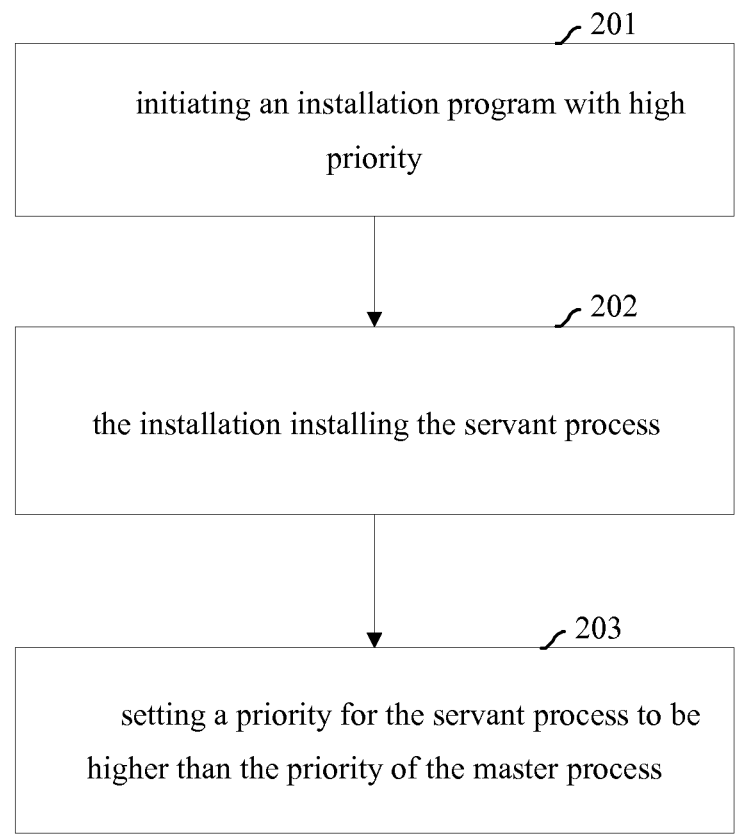
FIG. 2 is an exemplary flowchart for a method for installing a servant process in accordance with another embodiment of the present invention.

FIG. 2 is an exemplary flowchart for a method for installing a servant process in accordance with another embodiment of the present invention. As shown in FIG. 2, the method includes the following steps.

Step 201: initiating an installation program with high priority.

In operating systems such as the Windows, the priority of the installation program may be set based on requirement, and the user can set the priority of the installation program in a prompt window.

Step 202: the installation installing the servant process.

Step 203: setting a priority for the servant process to be higher than the priority of the master process.

After the installation, the servant process can be executed. The servant process can be initiated by other processes that need to acquire input events, such as key events. After the initiation of the servant process, it can check whether it has received key values to be configured, and if so, adds the key values to be configured to the input event list. The servant process also determines whether it is time to scan input events based on a scan time period set by a timer, and if so, it scans a key event, and transmits the key value to a pre-configured master process. When all the master process in need of acquiring input events requests the servant process to cease operation, the servant process exits.

Figure 3:
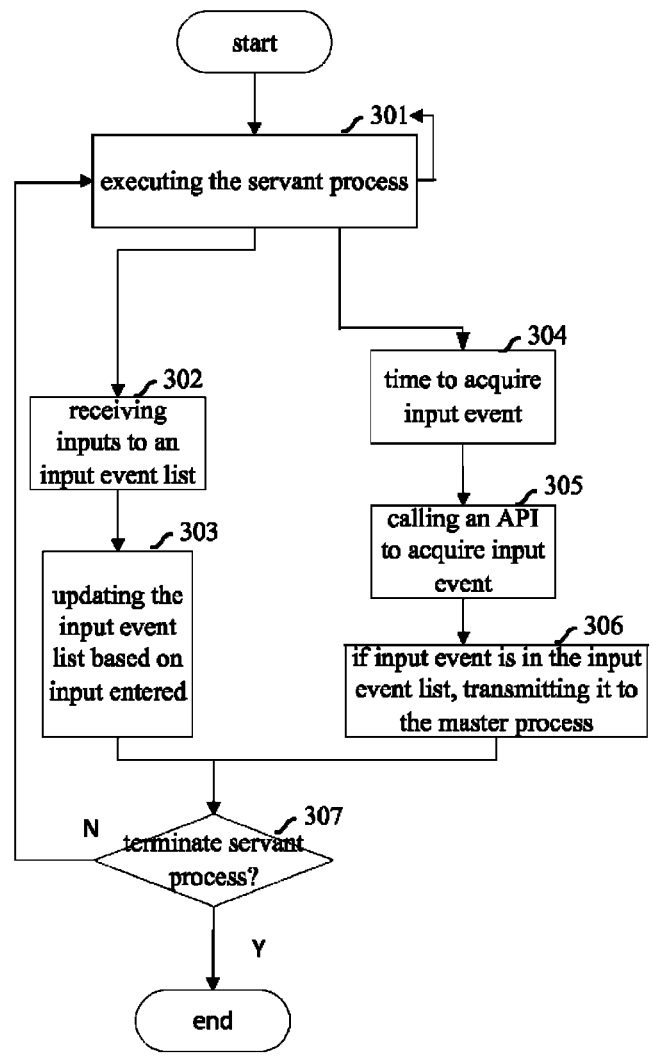
FIG. 3 is an exemplary flowchart for a method for executing a servant process in accordance with yet another embodiment of the present invention.

FIG. 3 is an exemplary flowchart for a method for executing a servant process in accordance with yet another embodiment of the present invention. As shown in FIG. 3, the method includes the following steps.

Step 301: executing the servant process. Here, the servant process can execute two parallel sub-processes, one in Steps 302 and 303, the other in Steps 304 and 305.

Step 302: servant process receiving an input to an input event list from the master process.

The master process set up the events to be reported to the master process in the input event list. The input events can include key events or mouse button events. For example, the input event list may contain certain special keys, or the combination of certain keys. The key values of the special keys or key combinations are transmitted to the master process only when these special keys or key combinations are pressed to avoid unnecessary transmission of input events.

Step 303: the servant process updating the input event list based on the input from the master process.

Step 304: determining whether it is time to acquire an input event.

Step 305: if it is time, the servant process calling an API command GetAsyncKeyState( ) to acquire an input event, such as a key event or a mouse button event.

Step 306: the servant process determining whether the input event is in the input event list, and if so, the servant process transmitting the input event to the master process.

Step 307: determinate whether to terminate the servant process; if so, terminating the servant process; otherwise, return to Step 301.

Figure 4:
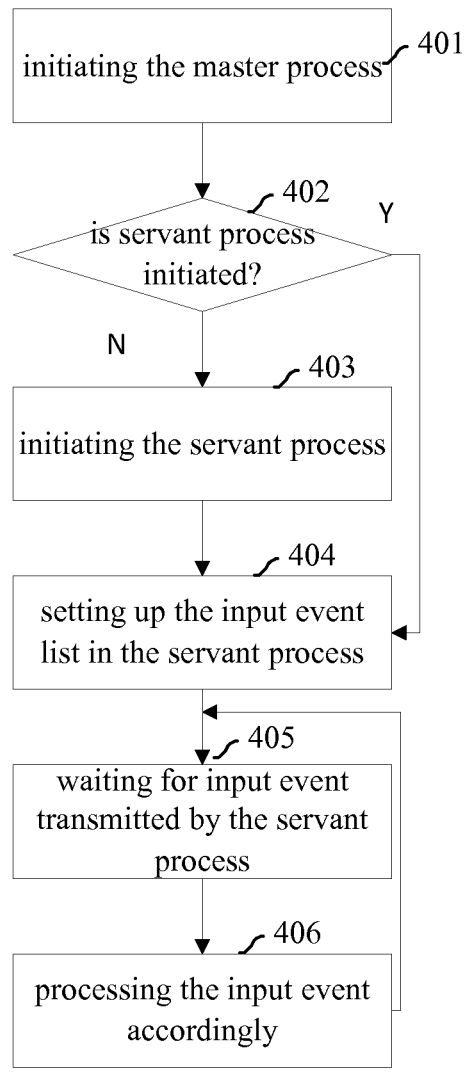
FIG. 4 is an exemplary flowchart for a method for executing a master process in accordance with yet another embodiment of the present invention.

The execution of the master process will be further described below. FIG. 4 is an exemplary flowchart for a method for executing a master process in accordance with yet another embodiment of the present invention.

As shown in FIG. 4, the method includes the following steps.

Step 401: initiating the master process.

Step 402: determining whether the servant process is initiated; if so, proceeding to Step 404; otherwise, proceeding to Step 403.

Step 403: initiating the servant process.

Step 404: setting up the input event list in the servant process.

Step 405: waiting for input event transmitted by the servant process

Step 406: upon acquiring an input event, processing the input event accordingly.

The embodiments of the present invention will be further described in connection with a gaming scenario. In this scenario, it is desired to conduct interactive conversations among multiple users using audio communication software.

Figure 5:
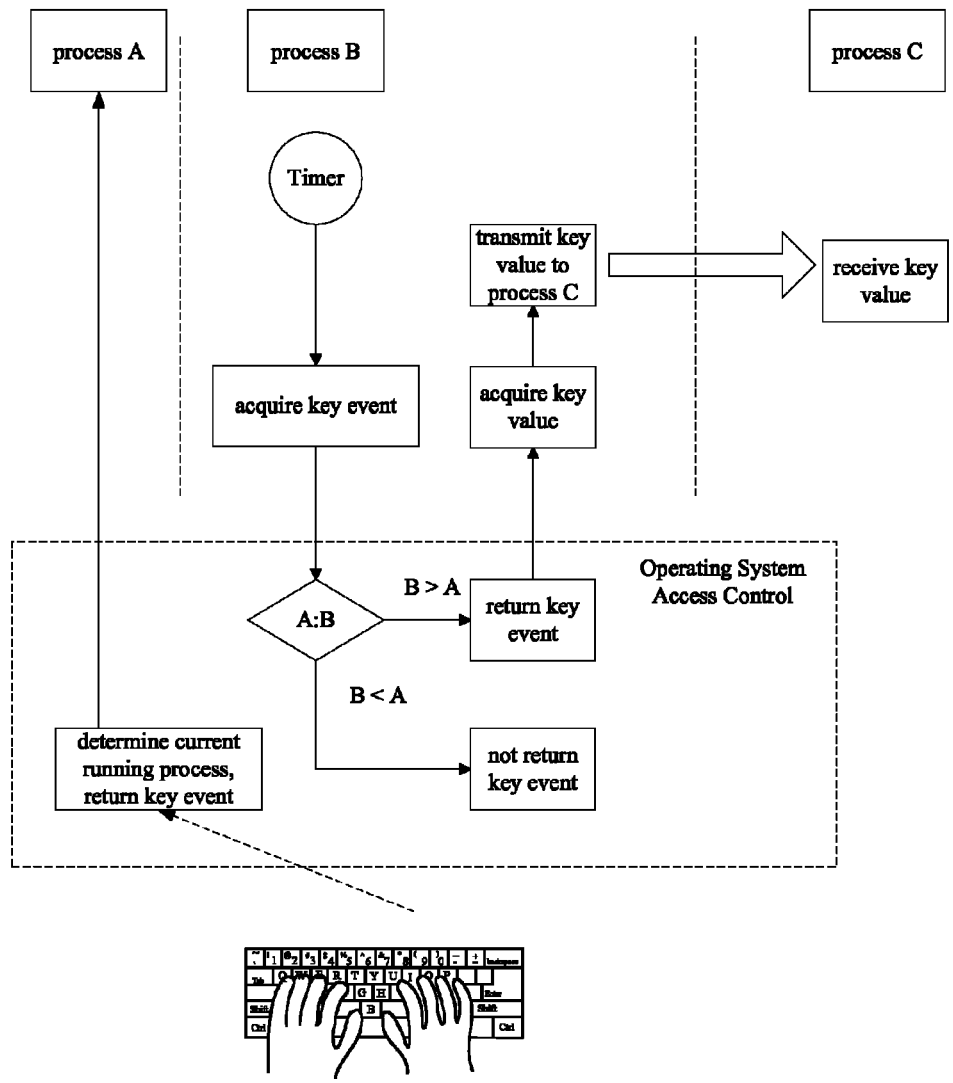
FIG. 5 is an exemplary flowchart for a method for acquiring input events in accordance with yet another embodiment of the present invention.

FIG. 5 is an exemplary flowchart for a method for acquiring input events in accordance with another embodiment of the present invention.

In FIG. 5, process A is a gaming process, process B is a servant process, and process C is an audio process, which is also a master process. The gaming process A has high priority, and typically is the running process under the operating system. Before the initiation of the servant process B, the operating system transmits the input events to process A.

To acquire input events, process C can initiate process B with a high priority. The priority of process B can be higher or equal to process A, and is higher than the priority of process C. Process C can set up the input events to be reported in the input event table in process B. When a key in the input event table is pressed, process B will transmit the input event to process C. Process B can actively acquire the input events from the operating system using a timer.

The operating system can compare the priority of process A and process B, and allow the transmission of input events to process B if its priority is higher than or equal to the priority of process A.

The embodiments of the present invention also provide an apparatus for acquiring inputs events.

Figure 6:
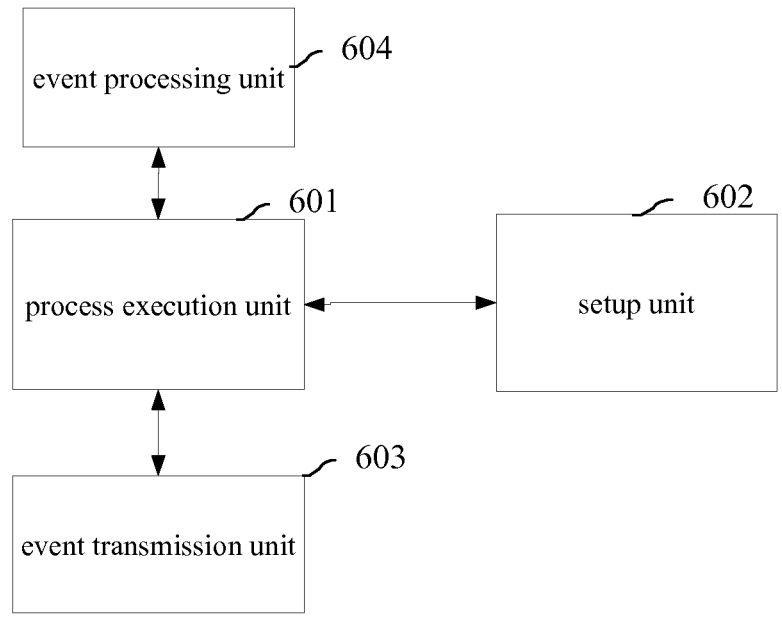
FIG. 6 is an exemplary schematic diagram for an apparatus for acquiring input events in accordance with yet another embodiment of the present invention.

FIG. 6 is an exemplary schematic diagram for an apparatus for acquiring input events in accordance with yet another embodiment of the present invention.

As shown in FIG. 6, the apparatus includes a process execution unit 601, a setup unit 602, and an event transmission unit 603.

The process execution unit 601 is used for executing a servant process and a master process; the setup unit 602 is used for setting the servant process with a higher priority than the master process, and for setting up an input event list in the servant process; and the event transmission unit 603 is used for, upon the servant process acquiring the input event and determining that the input event is in the input event list, transmitting the input event to the master process.

In another embodiment, the setup unit 602 is further used for setting the priority of the servant process higher than or equal to a priority of a current running process; and the event transmission unit 603 is further used for transmitting the input event to the current running process.

In another embodiment, the apparatus further includes an event processing unit 604 for, after the master process receiving the input event, processing the input event.

In another embodiment, the input event includes a key event or a mouse button event, and the event transmission unit 603 is used for calling an API command GetAsyncKeyState( ) to acquire a key event or a mouse button event.

In another embodiment, the input event list includes a plurality of key values that the master process is configured to process, and the event transmission unit 603 is used for controlling the servant process to acquire a key value and determine whether the master process is configured to process the key value, and if so, transmitting the key value to the master process.

In another embodiment, the input event list includes a plurality of mouse button values that the master process is configured to process, and the event transmission unit 603 is configured for controlling the servant process to acquire a mouse button value and determine whether the master process is configured to process the mouse button value, and if so, transmitting the mouse button value to the master process.

Figure 7:
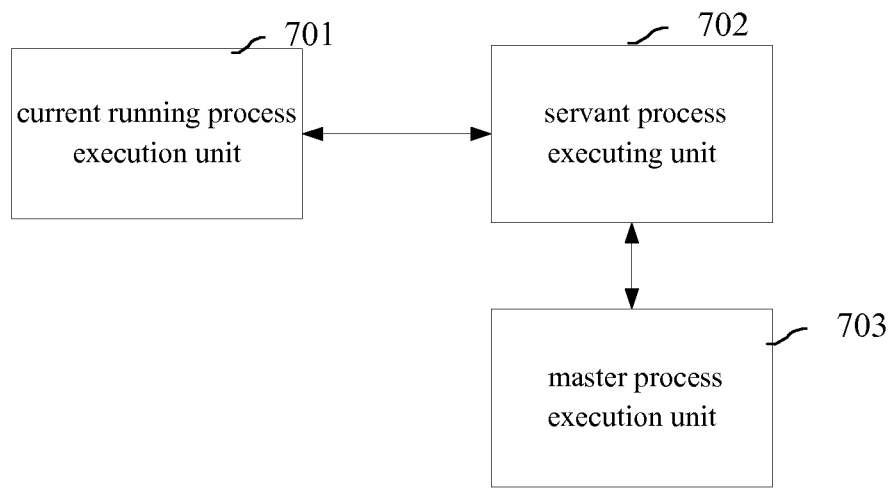
FIG. 7 is an exemplary schematic diagram for a system for acquiring input events in accordance with yet another embodiment of the present invention.

The embodiments of the present invention also provide a system for acquiring inputs events. FIG. 7 is an exemplary schematic diagram for a system for acquiring input events in accordance with another embodiment of the present invention.

As shown in FIG. 7, the system includes a current running process execution unit 701, a servant process execution unit 702, and a master process executing unit 703.

The current running process execution unit 701 is used to execute the current running process; the master process execution unit 703 is used for executing the master process; the servant process executing unit 702 is used for executing the servant process, and includes an input event list. The servant process is set with a priority higher than the master process. The servant process is also set with a priority higher than or equal to the current running process.

The servant process execution process 702 is also used for acquiring an input event; upon determining that the input event is in the input event list, transmitting the input event to the master process; and upon determining that the input event is not in the input event list, transmitting the input event to the current running process.

In another embodiment, the current running process execution unit 701 is used to execute a gaming program, and the master process execution unit 703 is used to execute an audio process.

The various components described in the embodiments of the present invention, such as the process execution unit 601, the setup unit 602, and the event transmission unit 603, the current running process execution unit 701, the servant process execution unit 702, and the master process execution unit 703, can be implemented by a computer processor executing software or firmware in memory. It should be noted that, in the above descriptions, the various modules in the apparatus are merely exemplary examples used to illustrate the embodiments of the present invention by way of examples. In practice, the various functions can be allocated to different modules based on need, and the apparatus can be divided into different modules to perform the whole or part of the functions described above. In addition, the operational principles of the apparatus embodiments are the same as or similar to those of the method methods, and the description of the method embodiments above can be referenced for the implementation details of the apparatus embodiments.

The method, apparatus and system for acquiring input events in accordance with embodiments of the present invention can be implemented by a variety of means.

For example, the method for acquiring input events can be formulated into software plug-in in accordance with a standardized application programming interface (API), or into a stand-long application program that users can download on their own. The plug-in can be in the form of an OCX, DLL, or cab. The method, apparatus and system for acquiring input events in accordance with embodiments of the present invention can also be implemented as a Flash plugin, RealPlayer Plug-in, MMS plugin, MI music plugin, ActiveX plugins.

A user can acquire input events on a wide variety of terminals, including without limitation, feature phones, smartphones, PDAs, personal computers (PC), Tablet PC or personal digital assistant (PDA), and so on. While these terminals are listed as exemplary examples, those skilled in the art would understand that the present invention is not limited to any particular type of terminals.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

In accordance with embodiments of the present invention, a servant process and a master process are executed, wherein the servant process comprises a higher priority than the master process and an input event list; and upon the servant process acquiring an input event and determining that the input event is in the input event list, the input event is being transmitted to the master process. Thus, the embodiments of the present invention provide a technical solution for acquiring input events using a servant process having a high priority, which facilitates the operation of other processes, enhances execution efficiency, and does not interfere with processing of input events by other processes.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for acquiring an input event in a computer system comprising different priorities for processes, the method comprising:
   executing a servant process and a master process, including:
      initiating an installation program with a high priority;
      displaying a prompt window for a user of the computer system to set the high priority of the installation program;
      installing the servant process through the installation program;
      setting, by the installation program, a priority of the servant process to be higher than the priority of the master process; and
      after the installation is complete and when the master process determines to initiate the servant process, executing the servant process;
   setting up an input event list in the servant process; and
   upon the servant process acquiring an input event and determining that the input event is in the input event list, the servant process transmitting the input event to the master process.

2. The method of claim 1, further comprising:
   setting the priority of the servant process higher than or equal to a priority of a current running process; and transmitting the input event to the current running process.

3. The method of claim 1, further comprising:
after receiving the input event, the master process processing the input event.

4. The method of claim 1, wherein the input event comprises a key event or a mouse button event, and the step of the servant process acquiring the input event comprises the servant process calling an application programming interface (API) command GetAsyncKeyState( ) to acquire a key event or a mouse button event.

5. The method of claim 1, wherein the input event list comprises a plurality of key values that the master process is configured to process, and the step of the servant process acquiring the input event and determining that the input event is in the input event list comprising:
servant process acquiring a key value, determining whether the master process is configured to process the key value, and if so, transmitting the key value to the master process.

6. The method of claim 1, wherein the input event list comprises a plurality of mouse button values that the master process is configured to process, and the step of the servant process acquiring the input event and determining that the input event is in the input event list comprising:
servant process acquiring a mouse button value, determining whether the master process is configured to process the mouse button value, and if so, transmitting the mouse button value to the master process.

7. The method of claim 1, further comprising:
executing a plurality of master processes;
creating, by the servant process, a plurality of servant sub-processes that have a same priority and functions as the servant process, each servant sub-process corresponding to one of the plurality of master processes, the functions including acquiring an input event and transmitting the input event to a corresponding master process;
for each servant sub-process, setting an input event list corresponding to the one of the plurality of maser processes; and
upon a servant sub-process acquiring an input event and determining that the input event is in the input event list corresponding to the one of the plurality of maser processes, the servant sub-process transmitting the input event to the corresponding master process.

8. The method of claim 1, further comprising:
formulating the method for acquiring the input event into a software plugin in accordance with standard APIs.

9. The method of claim 8, wherein a form of the software plugin including: ocx, dll, cab, Flash plugin, RealPlayer plugin, Microsoft Media Server plugin, and ActiveX plugin.

10. The method of claim 1, further comprising:
when the master process requests the servant process to cease operation, exiting the servant process.

11. The method of claim 1, wherein:
the servant process acquiring the input event does not interfere with processing of the input event by other processes running in the computer system.

12. An apparatus for acquiring an input event in a computer system comprising different priorities for processes, comprising:
a process execution unit for executing a servant process and a master process;
a setup unit for setting the servant process with a higher priority than the priority of the master process, and for setting up an input event list in the servant process; and an event transmission unit for, upon the servant process acquiring an input event and determining that the input event is in the input event list, transmitting the input event to the master process;
wherein the setup unit setting the servant process with a higher priority than the priority of the master process further including:
initiating an installation program with a high priority;
displaying a prompt window for a user of the computer system to set the high priority of the installation program;
installing the servant process through the installation program; and
setting, by the installation program, a priority of the servant process to be higher than the priority of the master process;
and wherein the process execution unit executing the servant process and the master process further including: after the installation is complete and when the master process determines to initiate the servant process, executing the servant process.

13. The apparatus of claim 12, wherein the setup unit is further configured for setting the priority of the servant process higher than or equal to a priority of a current running process; and the event transmission unit is further configured for transmitting the input event to the current running process.

14. The apparatus of claim 12, further comprising an event processing unit for, after the master process receiving the input event, processing the input event.

15. The apparatus of claim 12, wherein the input event comprises a key event or a mouse button event, and the event transmission unit is configured for calling an API command GetAsyncKeyState( ) to acquire a key event or a mouse button event.

16. The apparatus of claim 12, wherein the input event list comprises a plurality of key values that the master process is configured to process, and the event transmission unit is configured for controlling the servant process to acquire a key value and determine whether the master process is configured to process the key value, and if so, transmitting the key value to the master process.

17. The apparatus of claim 12, wherein the input event list comprises a plurality of mouse button values that the master process is configured to process, and the event transmission unit is configured for controlling the servant process to acquire a mouse button value and determine whether the master process is configured to process the mouse button value, and if so, transmitting the mouse button value to the master process.

18. A system for acquiring an input event in a computer system comprising different priorities for processes, comprising:
a current running process execution unit for executing the current running process;
a master process execution unit for executing the master process and
a servant process executing unit for executing the servant process, including:
initiating an installation program with a high priority;
displaying a prompt window for a user of the computer system to set the high priority of the installation program;
installing the servant process through the installation program;

setting, by the installation program, a priority of the servant process to be higher than the priority of the master process; and after the installation is complete and when the master process determines to initiate the servant process, executing the servant process;

wherein the servant process comprises an input event list, and a priority of the servant process is higher than or equal to a priority of the current running process; and the servant process execution process is configured for acquiring an input event; upon determining that the input event is in the input event list, transmitting the input event to the master process; and upon determining that the input event is not in the input event list, transmitting the input event to the current running process.

19. The system of claim 18, wherein the servant process execution process is configured to execute a gaming program, and the master process execution unit is configured to execute an audio process.

* * * * *